(12) United States Patent
Tsubai

(10) Patent No.: US 6,348,878 B1
(45) Date of Patent: Feb. 19, 2002

(54) DATA ENTRY KEYBOARD

(76) Inventor: Kenzo Tsubai, 3637 W. Alabama, Suite 155, Houston, TX (US) 77027

(*) Notice: Subject to any disclaimer, the term of this patent is extended or adjusted under 35 U.S.C. 154(b) by 0 days.

(21) Appl. No.: 09/636,572

(22) Filed: Aug. 10, 2000

(51) Int. Cl.[7] .............................................. H03K 17/94
(52) U.S. Cl. ............................ 341/23; 341/20; 341/21; 341/22; 400/436; 400/489; 400/472
(58) Field of Search ........................ 341/20, 22, 23, 341/21; 400/486, 489, 472; 708/145, 146

(56) References Cited

U.S. PATENT DOCUMENTS

| | | | | |
|---|---|---|---|---|
| 4,519,721 A | | 5/1985 | Gardner | 400/472 |
| 5,003,301 A | * | 3/1991 | Romberg | 341/22 |
| 5,124,702 A | * | 6/1992 | Van Ardenne | 341/22 |
| RE34,304 E | * | 7/1993 | Goldwasser et al. | 341/22 |
| 5,336,002 A | | 8/1994 | Russo | 400/489 |
| 5,367,298 A | * | 11/1994 | Axthelm | 400/486 |
| 5,469,160 A | | 11/1995 | Yang | 341/22 |
| 5,497,151 A | * | 3/1996 | Dombroski | 341/22 |
| 5,498,088 A | | 3/1996 | Choate | 400/486 |
| 5,584,588 A | | 12/1996 | Harbaugh | 400/486 |
| 5,625,354 A | * | 4/1997 | Lerman | 341/20 |
| 5,626,429 A | | 5/1997 | Choate | 400/487 |
| 5,793,312 A | | 8/1998 | Tsubai | 341/22 |
| 5,836,705 A | | 11/1998 | Choate | 400/486 |
| 5,847,697 A | * | 12/1998 | Sugimoto | 345/168 |
| 5,879,089 A | | 3/1999 | Armel | 400/489 |
| D417,662 S | | 12/1999 | Leung | D14/456 |

OTHER PUBLICATIONS

Dvorak, et al Typewriting Behavior: Psychology applied to teaching and learning Typewriting, pp. 214, 222 353, 1936.
H. Beker and F. Piper Cipher Systems, Wiley–Interscience, 1982.

* cited by examiner

Primary Examiner—Michael Horabik
Assistant Examiner—Albert K. Wong
(74) Attorney, Agent, or Firm—Keeling Hudson L.L.C.

(57) ABSTRACT

A keyboard layout for a one-handed keypad having fifteen alphabetic keys. Each key has a primary letter and a secondary letter. The primary letter is keyed by solely striking the key, while the secondary letter requires striking a secondary key first or simultaneously with the primary alphanumeric key. The layout placement minimizes finger travel and keystrokes to generate the most common letters and digraphs in the English language.

10 Claims, 6 Drawing Sheets

DATA ENTRY KEYBOARD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

This invention relates to a one-handed data entry keyboard for use with a computer or like devices. Specifically, the invention describes a keyboard layout ergonomically designed to minimize finger movement based on the most common letters and combinations of letters used in the English language.

2. Related Art

As computers and like devices get smaller and more portable, it is desirable to have smaller than standard-sized keyboards. While the size of the electronics can be reduced to microscopic levels, and the display can be miniaturized and compensated by various methods including scrolling, the keyboard input remains a physical size limitation for the new generation of portable computers. Currently, this need is typically met by the "miniaturized keyboard", in which the size of standard layout keys is reduced to achieve the smaller sizes desired. This miniaturization is typically of a standard QWERTY keyboard, so named for the first six keys on the top row. This approach has limited efficiency and a minimum level of miniaturization, since the size of users' hands and fingers remains constant. Thus, multiple keys are inadvertently stuck, or the user resorts to typing each key with the forefingers in a "hunt and peck" style.

A preferred approach to the problem is one-hand keyboards. These keyboards are smaller, since they require fewer keys than the minimum 72-key computer keyboard. By requiring fewer keys, one-hand keyboards can use full-sized keys.

Besides the benefit to miniaturized portable computers, one-hand keyboards are also useful in any application where one-hand use is preferred. Examples of such uses include CAD/CAM operators, who prefer to keep one hand on a "mouse" input device while the second hand remains on the keyboard; inventory recording devices which allow the user to handle items with one hand while inputting data with the other; and users with disabilities that allow the functional use of only one hand.

One type of one-hand keyboard is a "chording" keyboard. Just as simultaneous striking of keys on a keyboard for a musical instrument, such as a piano, result in a distinct musical chord, simultaneous striking of keys on a chording computer alphanumeric input keyboard result in various letters. These keyboards have a small number of keys, typically five. Thus striking the first two keys may result in the letter "A", and striking the first, third and fifth key may result in the letter "Z". These systems have coding systems that are difficult to learn and master. Besides having to learn chording codes for upper and lower case letters as well as numerals, the user must also remember less frequently used commands such as "Control", "Alternate", "Escape", etc.

The preferred one-hand keyboard is of the type described by Tsubai in U.S. Pat. No. 5,793,312, herein incorporated by reference. This keyboard has a plurality of primary alphanumeric keys, at least one secondary key, and a controller. When a primary alphanumeric key is depressed alone, its output signal results in the output of a primary letter, numeral or function. When a primary alphanumeric key is depressed simultaneously with one or more secondary keys, the controller interprets the multiple output signals and outputs a secondary letter, numeral or function. This keyboard operates very well, and is easy to learn the codes that are printed on top of each key as in a standard keyboard. However, a standard for the keyboard layout, based on ergonomic and heuristic principals, needs to be developed for use of such one-hand keyboards.

The speed, pace and rhythm of typing relies in part on "alternating keystrokes". It is faster to hit a first key and a second key with different fingers ("alternating keystrokes"), rather than hitting the same key or different keys with the same finger ("redundant keystrokes").

It would be a new and useful improvement of the prior art for a keyboard layout to be developed that is easy to learn and minimizes finger movement and redundant keystrokes.

BRIEF SUMMARY OF THE INVENTION

Accordingly, the objectives of this invention are to provide, inter alia, a new and improved one-hand keyboard layout that:

is easy to learn;

requires minimum finger movement;

minimizes redundant keystrokes;

allows fast data input; and includes all alphanumeric and functional keys found on a standard computer keyboard.

These objectives are addressed by the structure and use of the inventive one-hand keyboard layout. A nineteen key keypad, comprising fifteen primary and four secondary keys, is laid out in a manner that maximizes the number of character signals generated from located on a "home" position or by using single keystrokes. The fifteen primary alphanumeric keys are laid out in three rows with five keys in each row. The most commonly used letters in the English language are on keys in a primary mode (not requiring the simultaneous striking of one or more secondary function keys). Further, the most common two-letter combinations (digraphs) are on keys in the primary mode and proximate to one another. Other objects of the invention will become apparent from time to time throughout the specification hereinafter disclosed.

BRIEF DESCRIPTION OF THE DRAWINGS COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

DETAILED DESCRIPTION OF THE INVENTION

Figure 1:
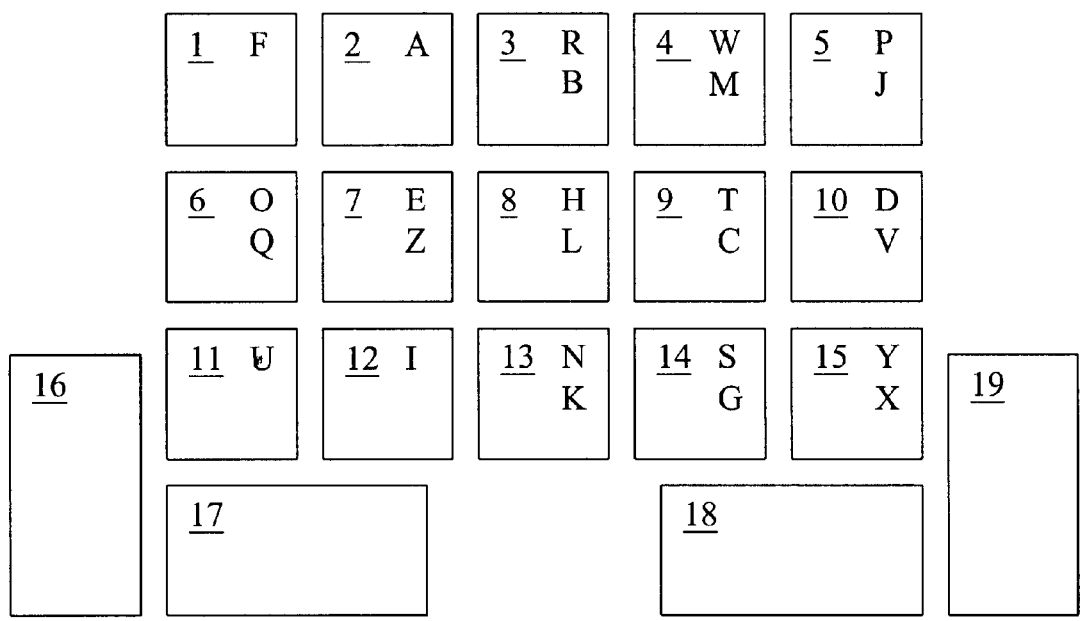
FIG. 1 depicts the preferred inventive layout of a one-handed right-handed keyboard.

The present invention is described as keyboard layout 50, depicted in block diagram form in FIGS. 1–8. The inventive keyboard is designed for use with any device requiring an alpha-numeric input, such as a desktop computer, Personal Digital Assistant (PDA), laptop computer, computer aided drafting/manufacturing (CAD/CAM) device, inventory recorder, equipment controller or other device in which a one-handed keypad would benefit the user.

Key 16, key 17, key 18 and key 19 are shown in FIGS. 1–8 to depict the preferred embodiment of the secondary keys. This invention, however, is primarily directed to the layout of primary alphanumeric key 1 through primary alphanumeric key 15. Primary alphanumeric keys 1–15 are arranged in a top row of five, a middle row of five and a bottom row of five. Each of the five keys in each row are aligned with keys in the other two rows, to form five columns, as depicted in FIGS. 1–10. While the preferred embodiment of the arrangement of the five columns of primary keys are vertical and aligned, it is understood that these columns make alternatively be arranged slightly offset, diagonal, staggered, or any other roughly vertical alignment preferred by the user/designer. Likewise, the three rows are depicted in FIG. 1–10 as straight horizontal rows. Alternatively, these rows may be slightly offset, diagonal, staggered, or any other roughly horizontal arrangement preferred by the user/designer.

The secondary keys 16–19 are arranged below and/or offset to the sides of primary alphanumeric keys 1–15, as depicted in FIGS. 1–8. The primary alphanumeric keys (keys 1–15 shown in FIG. 1) are capable of generating an electric signal for alphanumeric (A–Z and 0–9) symbols. The primary alphanumeric keys generate a signal for a primary letter solely by pressing the primary alphanumeric key. Signals for secondary letters and numerals are generated by depressing a primary alphanumeric key and at least one secondary key. The secondary keys (keys 16–19 of FIG. 1) are also capable of generating computer function signals, as well as generating secondary signals that allow the user to select a secondary letter or numeral for a key. Secondary keys 16–19 also control upper and lower case designation of letters.

All keyboard layouts 50 are directed to a one-handed keyboard, depicted in the preferred embodiment and herein incorporated by reference as that described in the Tsubai U.S. Pat. No. 5,793,312. Alternate embodiments include any device having a keypad/keyboard with a reduced number of keys.

The preferred alphabetical keyboard layout 50 is depicted in FIG. 1. Keys 1–15 are the primary alphanumeric keys, and keys 16–19 are secondary keys used for functions such as "Shift", "Alternate", "Control", "Numeral Lock", etc. All 26 letters of the English alphabet are represented on Keys 1 through 15. With the exception of Keys 1, 2, 11, and 12, each key contains two letters, a primary letter (shown at the top of each key) and a secondary letter (shown in the middle or lower portion of each key). Users may choose between the primary and secondary letters by utilizing any of a number of ways available. For example, pressing a single primary alphanumeric key (Keys 1–15) generates a signal for the primary letter depicted on the upper portion of the key. To generate a signal representing the secondary letter depicted in the lower portion of the key, the user presses at least one of the secondary keys (Keys 16–19) before pressing the primary alphanumeric key. Alternatively, the user may press a primary alphanumeric key and a secondary key concurrently, as described in the Tsubai U.S. Pat. No. 5,793,312, to generate a signal for a secondary letter. Functions other than alphabetic, such as symbols, may be entered by first pressing, and thereby changing the key functions from alphabetic to symbolic or function, by first pressing one or more of the secondary keys.

The primary letters of the primary alphanumeric keys are F, A, R, W, P, O, E, H, T, D, U, I, N, S and Y. These letters account for 85.087% of alphabetic occurrences in words in the English language. The user is therefore able to type the vast majority of all words without striking any secondary keys, affording high typing speeds.

Figure 2:
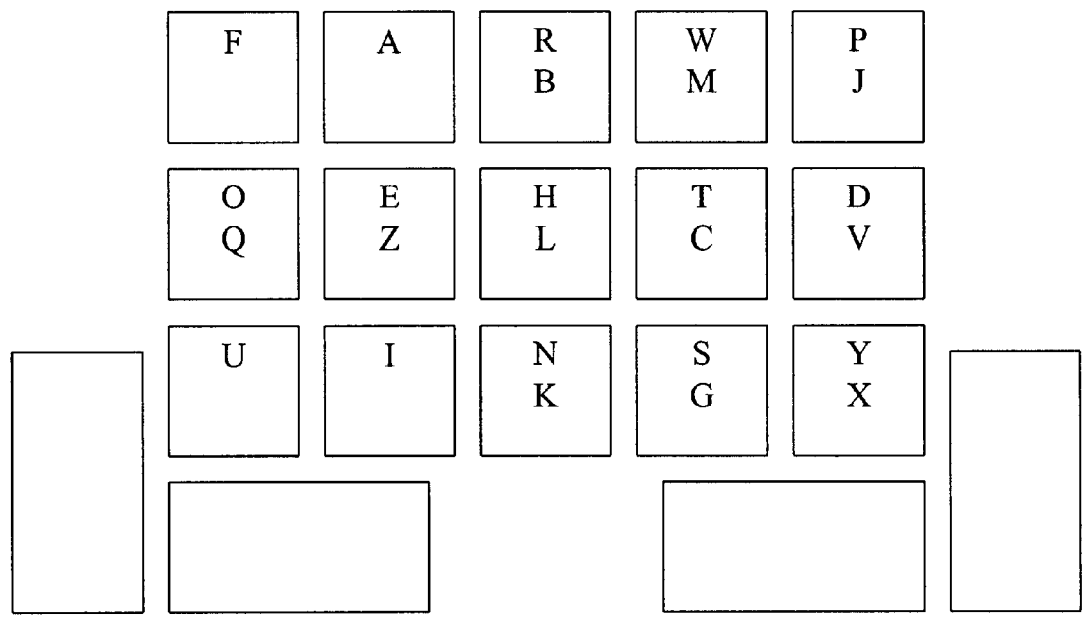
FIG. 2 depicts the preferred inventive layout of a one-handed right-handed keyboard without identifying numerals.
Figure 3:
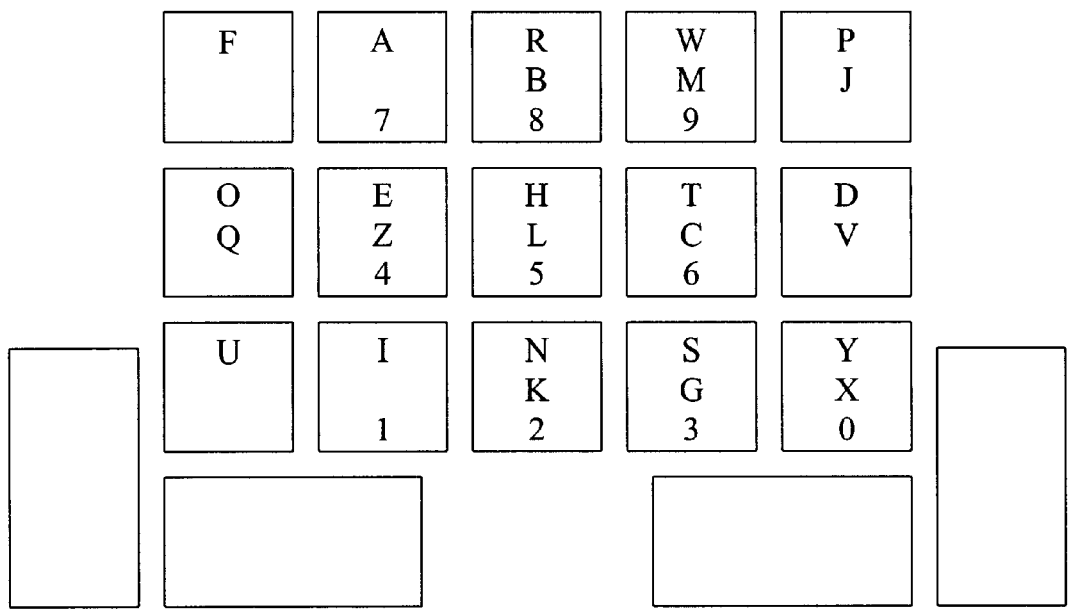
FIG. 3 depicts the preferred inventive layout of a one-handed right-handed keyboard without identifying numerals, plus the preferred layout of numeric keys.

FIG. 2 shows, for the purposes of clarity, the keys without their identifiers (identifier numerals 1–19). FIG. 3 shows the keys again without their identifiers (numerals 1–19), plus the location of device keys for the numerals 0–9, arranged in a standard numeric keypad orientation. In the preferred embodiment, signals for numerals O–9 are generated by changing the primary alphanumeric key function with a secondary key, typically key 17, 18 and/or 19.

Figure 4:
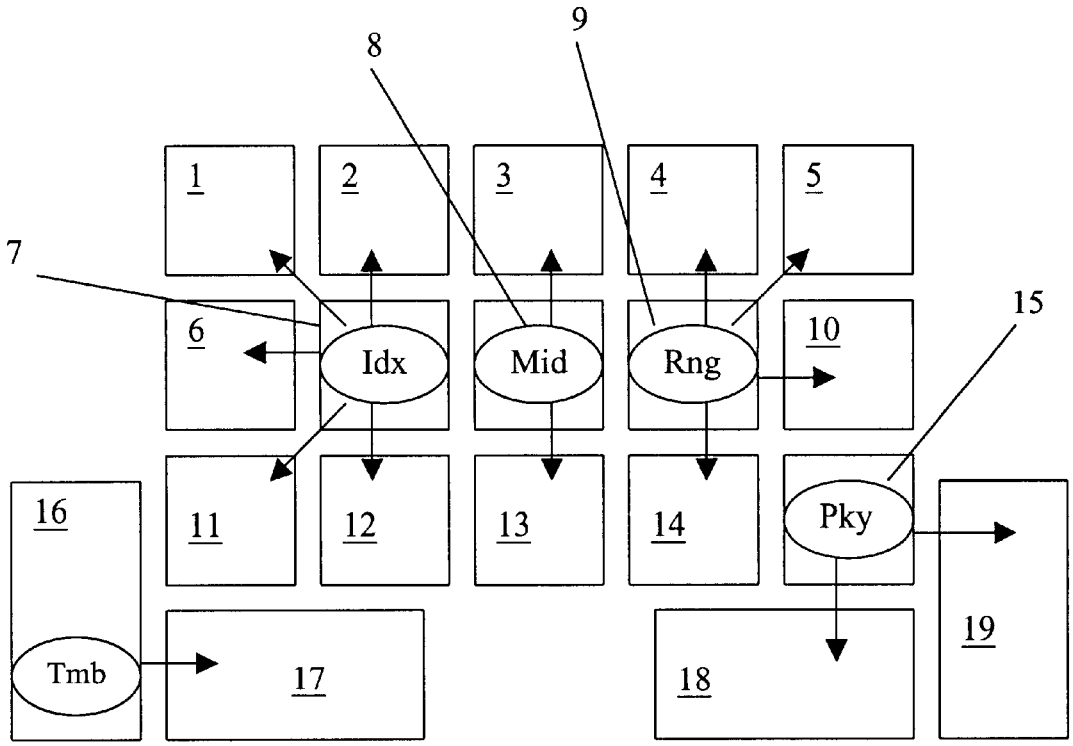
FIG. 4 depicts the preferred finger placement for right-handed users.

As seen in FIG. 4, the preferred right-handed "home" orientation of the operator's fingers on the keypad is the Thumb on Key 16, Index Finger on Key 7, Middle Finger on Key 8, Ring Finger on Key 9, and Pinky Finger on Key 15. The arrows emanating from each finger indicator show the preferred finger movement to keys away from the "home" position. These arrows depict the most natural and efficient way of striking all 15 primary alphanumeric keys according to hand ergonomic principals, including minimization of finger travel distance, crossover and reach.

The frequency of single letters in the English language, in descending order, is shown in Table 1:

TABLE 1

| Letter | Percentage of total occurrences | Letter | Percentage of total occurrences |
|---|---|---|---|
| E | 12.702 | M | 2.406 |
| T | 9.056 | W | 2.360 |
| A | 8.167 | F | 2.228 |
| O | 7.507 | G | 2.015 |
| I | 6.996 | Y | 1.974 |
| N | 6.749 | P | 1.929 |
| S | 6.327 | B | 1.492 |
| H | 6.094 | V | 0.978 |
| R | 5.987 | K | 0.772 |
| D | 4.253 | J | 0.153 |
| L | 4.025 | X | 0.150 |
| C | 2.782 | Q | 0.095 |
| U | 2.758 | Z | 0.074 |

Source: H. Beker and F. Piper, *Cipher Systems*, Wiley-Interscience, 1982.

As is shown in Table 1, the most frequently used letters in the English language are E, T, A, O, I, N, S, H, R and D. Using nine of these letters, and substituting in the letter U for R, Professor August Dvorak developed the Dvorak keyboard in the early 20$^{th}$ Century. The letters A, O, E, U, I, D, H, T, N and S comprise the middle row of keys in the Dvorak keyboard, as these letters account for 70% of all occurrences of letters used in the English language.

Figure 5:
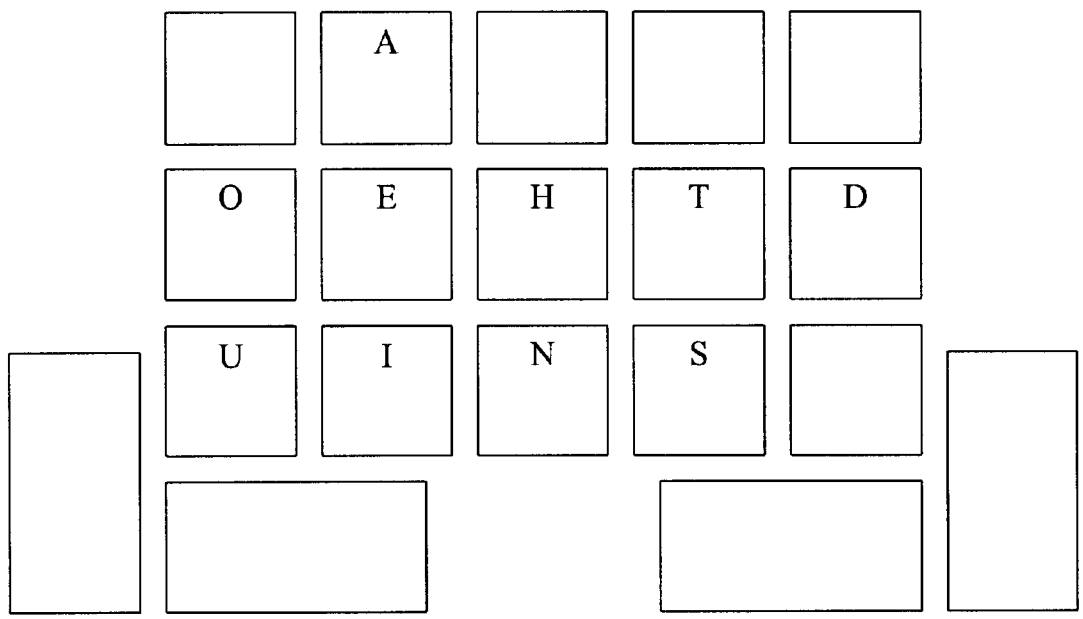
FIG. 5 depicts the placement of the top 10 Dvorak primary alphanumeric keys on a one-handed right-handed keypad.

The same letters found on the middle row of a Dvorak Simplified Keyboard (DSK) are shown in FIG. 5. While the letter R may be slightly more frequent in use than the letter U, keyboard layout 50 allows the keys for all five vowels to be struck by the index finger, and the five most common consonants are struck by the middle and ring fingers. Having the vowels all on primary alphanumeric keys struck with the same index finger is heuristically advantageous, since at least one vowel is found in every common English word. In addition, it is ergonomically advantageous to alternate keystrokes between fingers, avoiding having the same finger striking the same or different keys sequentially. Since most English words use consonants between vowels, this ensures a greater percentage of keystrokes alternating between fingers. Further, since the index, middle and ring fingers are the most nimble and strongest fingers, their frequent use keying vowels is ergonomically expedient.

Figure 6:
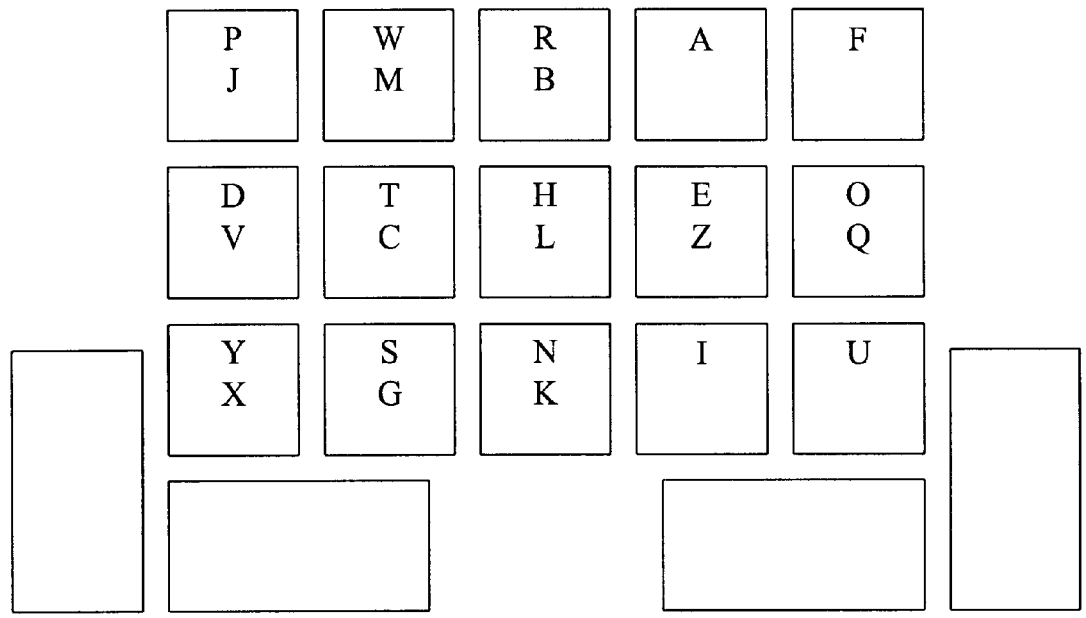
FIG. 6 depicts the preferred inventive layout of a one-handed left-handed keyboard without identifying numerals.
Figure 7:
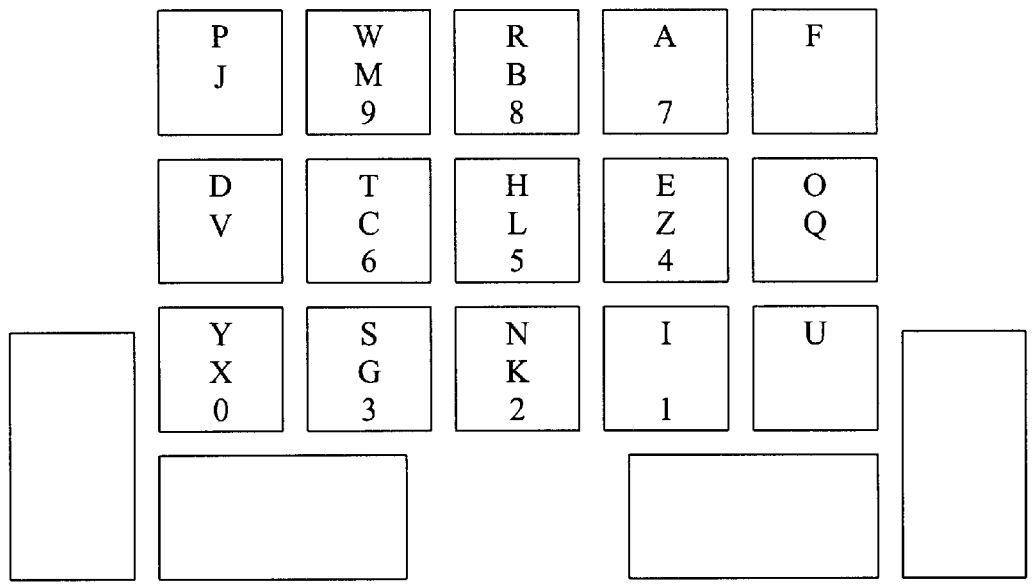
FIG. 7 depicts the preferred inventive layout of a one-handed left-handed keyboard without identifying numerals, plus an alternate layout of numeric keys.

If the user is left-handed, FIG. 6 depicts the preferred keyboard layout. The layout in FIG. 6 is a reverse mirror image of that found in FIGS. 1 and 2, and affords the user the same fingering advantages as described above for the right-handed keyboard. In FIG. 7, this same left-handed layout is shown, with an alternate numeric keypad orientation. The numeric keypad is engaged as described above for FIG. 3. The numerals are reversed as shown, allowing the user the option of a numeric keypad in which the numerals ascend "outward" (from index finger to ring finger), plus having the numerals "1", "4" and "7" punched by the "home" index finger. This alternate numeric keypad can also be incorporated into the alphabetical keypad depicted in FIGS. 1 and 2, if the user should so desire.

Figure 8:
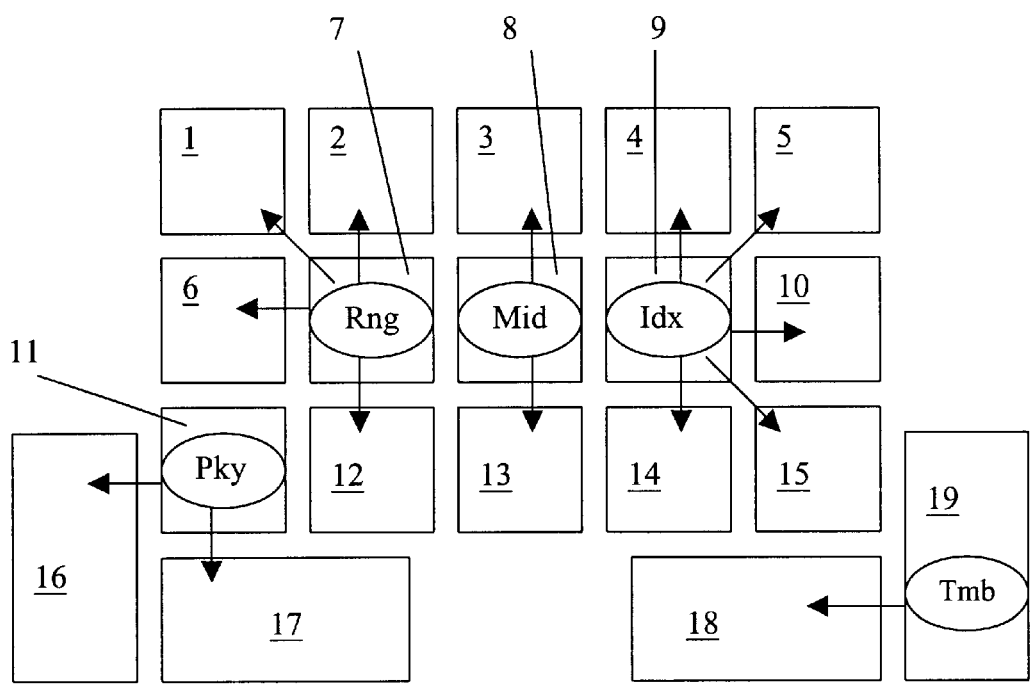
FIG. 8 depicts the preferred finger placement for left-handed users.

FIG. 8 the preferred left-handed "home" orientation of the operator's fingers on the keypad is the Thumb on Key 19, Index Finger on Key 9, Middle Finger on Key 8, Ring Finger on Key 7, and Pinky Finger on Key 11. The arrows emanating from each finger indicator show the preferred finger movement to keys away from the "home" position. These arrows depict the most natural and efficient way of striking all 15 primary alphanumeric keys according to hand ergonomic principals.

In addition to having the most frequently used letters ergonomically arranged as primary letters (not requiring depression of a secondary key) on the primary alphanumeric keys, the keyboard layout described in FIGS. 1–4 (and analogously in FIGS. 6–8) also affords an efficient layout of digraphs. A digraph is a sequence of two letters that make a single sound when spoken. According to August Dvorak et al., *Typewriting Behavior*, 1936, New York, American Book Company, the 137 most common digraphs make up 90% of English text. The 11 most common digraphs account for one-quarter of the letters used in English words, 34 make up one-half, and just 57 digraphs account for three-quarters of all typewritten copy.

TABLE 2

| Digraph | Ranking of occurrences | Digraph | Ranking of occurrences |
| --- | --- | --- | --- |
| th | 1 | nt | 16 |
| er | 2 | ea | 17 |
| on | 3 | ti | 18 |
| an | 4 | to | 19 |
| re | 5 | it | 20 |
| he | 6 | st | 21 |
| in | 7 | io | 22 |
| ed | 8 | le | 23 |
| nd | 9 | is | 24 |
| ha | 10 | ou | 25 |
| at | 11 | ar | 26 |
| en | 12 | as | 27 |
| es | 13 | de | 28 |
| of | 14 | rt | 29 |
| or | 15 | ve | 30 |

Figure 9:
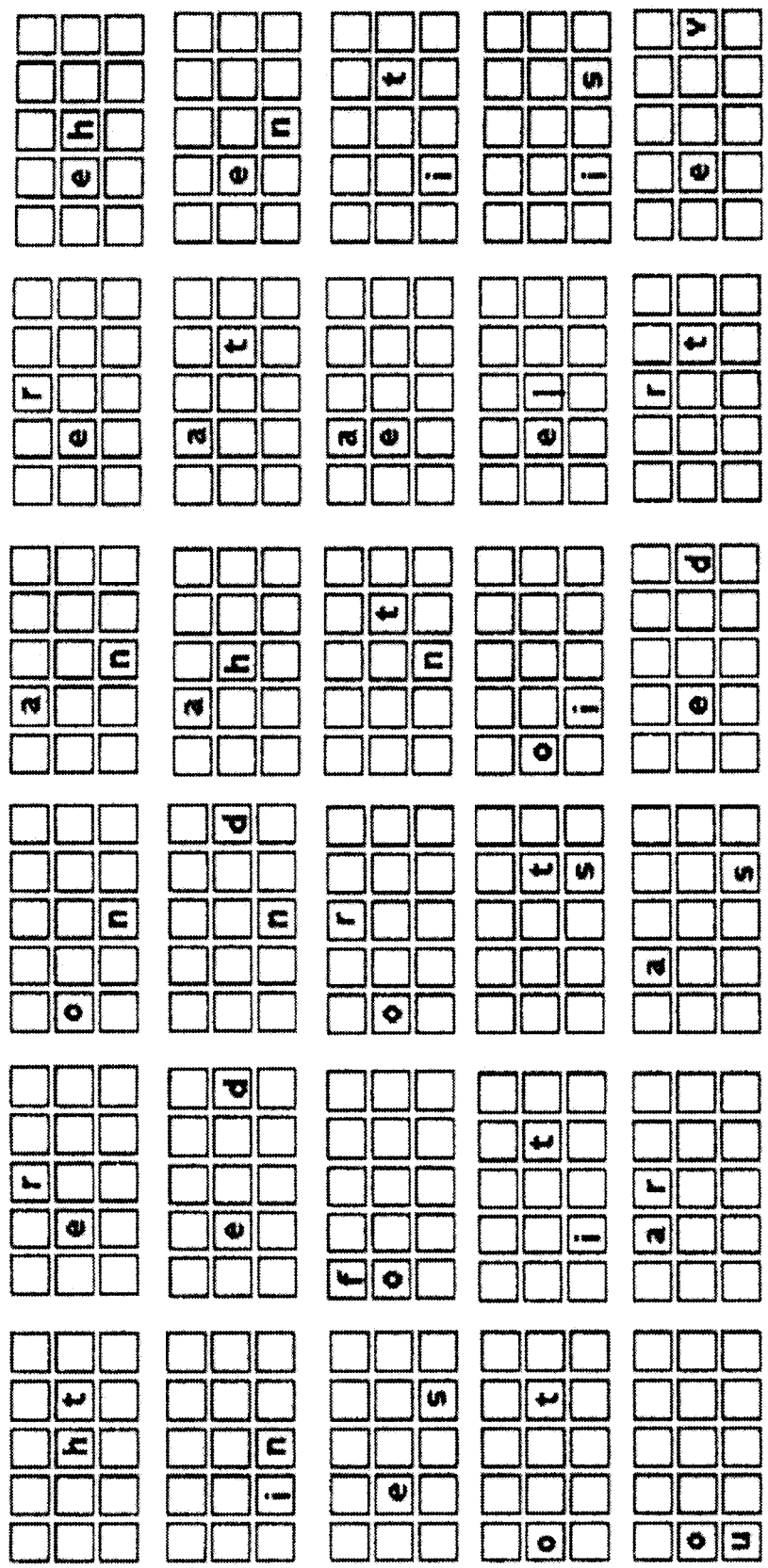
FIG. 9 depicts the letter placement of the 30 most common digraphs.
Figure 10:
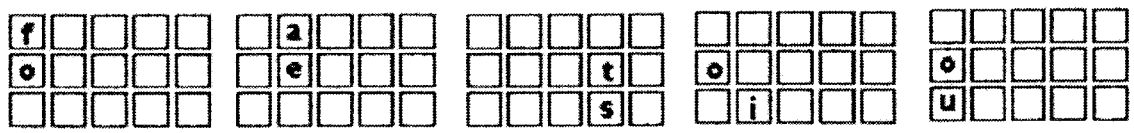
FIG. 10 depicts the letter placement of five common digraphs requiring the use of the same finger for keying.

FIG. 9 shows the placement on the present inventive keyboard of the 30 most common digraphs used in the English language shown in Table 2, which account for over a third of the keystrokes in the written word. Of these 30 digraphs, 28 use primary letters only. The only two of these most common digraphs that use a secondary letter are the digraph "le", which uses primary letter "e" and secondary letter "l", and the digraph "ve", which uses primary letter "e" and secondary letter "v". The frequency ranking of these two digraphs is relatively low, with "le" ranked 23$^{rd}$ and "ve" ranked 30$^{th}$. In addition, the layout minimizes the number of digraphs that require striking keys that are not on adjacent rows. The exceptions to these placements are "an" and "as". Finally, as seen in FIG. 10, only five of the top 30 digraphs require the same finger to strike consecutive keys. Of these five none require finger travel from the top row to the bottom row, further improving typing efficiency. None of the 30 most common digraphs require the use of the same key to strike the primary letter and the secondary letter.

In the preferred embodiment, the keys are standard sized using standard placement. The tops of the keys are ½" square, and placement of the keys are ¾" center to center between keys. The primary alphanumeric keys are aligned in three rows and five columns, also aligned as depicted in FIGS. 1–8.

The foregoing disclosure and description of the invention are illustrative and explanatory thereof. Various changes in the details of the illustrated construction may be made within the scope of the appended claims without departing from the spirit of the invention. The present invention should only be limited by the following claims and their legal equivalents.

I claim:

1. A keyboard for a data entry system operable with one hand, comprising:

a top row, a middle row and a bottom row of primary alphanumeric keys, each of said rows having five keys;

said top row, middle row and bottom row of primary alphanumeric keys further forming a first column, a second column, a third column, a fourth column, and a fifth column of said primary alphanumeric keys, said first column being the furthest to the left, said second, third, fourth and fifth columns respectively listed subsequently being further to the right;

each of said plurality of primary alphanumeric keys capable of generating a primary signal for a primary letter and a secondary signal for a secondary letter;

each said primary signal being generated by solely depressing one of said primary alphanumeric keys;

each said secondary signal being generated by depressing one of said primary alphanumeric keys and at least one secondary key;

said primary alphanumeric key in said top row and said first column capable of generating a primary signal for a primary letter "F";

said primary alphanumeric key in said top row and said second column capable of generating a primary signal for a primary letter "A";

said primary alphanumeric key in said top row and said third column capable of generating a primary signal for a primary letter "R" and a secondary signal for a secondary letter "B";

said primary alphanumeric key in said top row and said fourth column capable of generating a primary signal for a primary letter "W" and a secondary signal for a secondary letter "M";

said primary alphanumeric key in said top row and said fifth column capable of generating a primary signal for a primary letter "P" and a secondary signal for a secondary letter "J";

said primary alphanumeric key in said middle row and said first column capable of generating a primary signal for a primary letter "O" and a secondary signal for a secondary letter "Q";

said primary alphanumeric key in said middle row and said second column capable of generating a primary signal for a primary letter "E" and a secondary signal for a secondary letter said primary alphanumeric key in said middle row and said third column capable of generating a primary signal for a primary letter "H" and a secondary signal for a secondary letter "Z";

said primary alphanumeric key in said middle row and said fourth column capable of generating a primary signal for a primary letter "T" and a secondary signal for a secondary letter "C";

said primary alphanumeric key in said middle row and said fifth column capable of generating a primary signal for a primary letter "D" and a secondary signal for a secondary letter "V";

said primary alphanumeric key in said bottom row and said first column capable of generating a primary signal for a primary letter "U";

said primary alphanumeric key in said bottom row and said second column capable of generating a primary signal for a primary letter "I";

said primary alphanumeric key in said bottom row and said third column capable of generating a primary signal for a primary letter "N" and a secondary signal for a secondary letter "K";

said primary alphanumeric key in said bottom row and said fourth column capable of generating a primary signal for a primary letter "S" and a secondary signal for a secondary letter "G"; and said primary alphanumeric key in said bottom row and said fifth column capable of generating a primary signal for a primary letter "Y" and a secondary signal for a secondary letter "X".

2. The keyboard as in claim 1, said at least one secondary key selected from a group of four secondary keys.

3. The keyboard as in claim 2, further comprising:

said group of four secondary keys comprising a first, second, third and fourth secondary key;

said first secondary key oriented offset to the left of said bottom row of primary alphanumeric keys;

said second and third secondary keys oriented below said bottom row of primary alphanumeric keys; and said fourth secondary key oriented offset to the right of said bottom row of primary alphanumeric keys.

4. The keyboard as in claim 1, further comprising:

a means for generating a numeric signal;

said means for generating said numeric signal comprising depressing at least one said secondary key and one of said primary alphanumeric keys;

said primary alphanumeric key in said top row and said second column capable of generating said numeric signal for a numeral "7";

said primary alphanumeric key in said top row and said third column capable of generating said numeric signal for a numeral "8";

said primary alphanumeric key in said top row and said fourth column capable of generating said numeric signal for a numeral "9";

said primary alphanumeric key in said middle row and said second column capable of generating said numeric signal for a numeral "4";

said primary alphanumeric key in said middle row and said third column capable of generating said numeric signal for a numeral "5";

said primary alphanumeric key in said middle row and said fourth column capable of generating said numeric signal for a numeral "6";

said primary alphanumeric key in said bottom row and said second column capable of generating said numeric signal for a numeral "1";

said primary alphanumeric key in said bottom row and said third column capable of generating said numeric signal for a numeral "2";

said primary alphanumeric key in said bottom row and said fourth column capable of generating said numeric signal for a numeral "3"; and said primary alphanumeric key in said bottom row and said fifth column capable of generating said numeric signal for a numeral "0".

5. The keyboard as in claim 1, further comprising:

a means for generating a numeric signal;

said means for generating said numeric signal comprising depressing at least one said secondary key and one of said primary alphanumeric keys;

said primary alphanumeric key in said top row and said second column capable of generating said numeric signal for a numeral "9";

said primary alphanumeric key in said top row and said third column capable of generating said numeric signal for a numeral "8";

said primary alphanumeric key in said top row and said fourth column capable of generating said numeric signal for a numeral "7";

said primary alphanumeric key in said middle row and said second column capable of generating said numeric signal for a numeral "6";

said primary alphanumeric key in said middle row and said third column capable of generating said numeric signal for a numeral "5";

said primary alphanumeric key in said middle row and said fourth column capable of generating said numeric signal for a numeral "4";

said primary alphanumeric key in said bottom row and said second column capable of generating said numeric signal for a numeral "3";

said primary alphanumeric key in said bottom row and said third column capable of generating said numeric signal for a numeral "2";

said primary alphanumeric key in said bottom row and said fourth column capable of generating said numeric signal for a numeral "1"; and said primary alphanumeric key in said bottom row and said first column capable of generating said numeric signal for a numeral "0".

6. A keyboard for a data entry system operable with one hand, comprising:

a top row, a middle row and a bottom row of primary alphanumeric keys, each of said rows having five keys;

said top row, middle row and bottom row of primary alphanumeric keys further forming a first column, a second column, a third column, a fourth column, and a fifth column of said primary alphanumeric keys, said first column being the furthest to the left, said second, third, fourth and fifth columns respectively listed subsequently being further to the right;

each of said plurality of primary alphanumeric keys capable of generating a primary signal for a primary letter and a secondary signal for a secondary letter;

each said primary signal being generated by solely depressing one of said primary alphanumeric keys;

each said secondary signal being generated by depressing one of said primary alphanumeric keys and at least one secondary key;

said primary alphanumeric key in said top row and said first column capable of generating a primary signal for a primary letter "P" and a secondary signal for a secondary letter "J";

said primary alphanumeric key in said top row and said second column capable of generating a primary signal for a primary letter "W" and a secondary signal for a secondary letter "M";

said primary alphanumeric key in said top row and said third column capable of generating a primary signal for a primary letter "R" and a secondary signal for a secondary letter "B";

said primary alphanumeric key in said top row and said fourth column capable of generating a primary signal for a primary letter "A";

said primary alphanumeric key in said top row and said fifth column capable of generating a primary signal for a primary letter "F";

said primary alphanumeric key in said middle row and said first column capable of generating a primary signal for a primary letter "D" and a secondary signal for a secondary letter said primary alphanumeric key in said middle row and said second column capable of generating a primary signal for a primary letter "T" and a secondary signal for a secondary letter said primary alphanumeric key in said middle row and said third column capable of generating a primary signal for a primary letter "H" and a secondary signal for a secondary letter "L";

said primary alphanumeric key in said middle row and said fourth column capable of generating a primary signal for a primary letter "E" and a secondary signal for a secondary letter "Z";

said primary alphanumeric key in said middle row and said fifth column capable of generating a primary signal for a primary letter "O" and a secondary signal for a secondary letter "Q";

said primary alphanumeric key in said bottom row and said first column capable of generating a primary signal for a primary letter "Y" and a secondary signal for a secondary letter "X";

said primary alphanumeric key in said bottom row and said second column capable of generating a primary signal for a primary letter "S" and a secondary signal for a secondary letter "G";

said primary alphanumeric key in said bottom row and said third column capable of generating a primary signal for a primary letter "N" and a secondary signal for a secondary letter "K";

said primary alphanumeric key in said bottom row and said fourth column capable of generating a primary signal for a primary letter "I"; and said primary alphanumeric key in said bottom row and said fifth column capable of generating a primary signal for a primary letter "U".

7. The keyboard as in claim 6, said at least one secondary key selected from a group of four secondary keys.

8. The keyboard as in claim 7, further comprising:

said group of four secondary keys comprising a first, second, third and fourth secondary key;

said first secondary key oriented offset to the left of said bottom row of primary alphanumeric keys;

said second and third secondary keys oriented below said bottom row of primary alphanumeric keys; and said fourth secondary key oriented offset to the right of said bottom row of primary alphanumeric keys.

9. The keyboard as in claim 6, further comprising:

a means for generating a numeric signal;

said means for generating said numeric signal comprising depressing at least one said secondary key and one of said primary alphanumeric keys;

said primary alphanumeric key in said top row and said second column capable of generating said numeric signal for a numeral "7";

said primary alphanumeric key in said top row and said third column capable of generating said numeric signal for a numeral "8";

said primary alphanumeric key in said top row and said fourth column capable of generating said numeric signal for a numeral "9";

said primary alphanumeric key in said middle row and said second column capable of generating said numeric signal for a numeral "4";

said primary alphanumeric key in said middle row and said third column capable of generating said numeric signal for a numeral "5";

said primary alphanumeric key in said middle row and said fourth column capable of generating said numeric signal for a numeral "6";

said primary alphanumeric key in said bottom row and said second column capable of generating said numeric signal for a numeral "1";

said primary alphanumeric key in said bottom row and said third column capable of generating said numeric signal for a numeral "2";

said primary alphanumeric key in said bottom row and said fourth column capable of generating said numeric signal for a numeral "3"; and said primary alphanumeric key in said bottom row and said fifth column capable of to generating said numeric signal for a numeral "0".

10. The keyboard as in claim 6, further comprising:

a means for generating a numeric signal;

said means for generating said numeric signal comprising depressing at least one said secondary key and one of said primary alphanumeric keys;

said primary alphanumeric key in said top row and said second column capable of generating said numeric signal for a numeral "9";

said primary alphanumeric key in said top row and said third column capable of generating said numeric signal for a numeral "8";

said primary alphanumeric key in said top row and said fourth column capable of generating said numeric signal for a numeral "7";

said primary alphanumeric key in said middle row and said second column capable of generating said numeric signal for a numeral "6";

said primary alphanumeric key in said middle row and said third column capable of generating said numeric signal for a numeral "5";

said primary alphanumeric key in said middle row and said fourth column capable of generating said numeric signal for a numeral "4";

said primary alphanumeric key in said bottom row and said second column capable of generating said numeric signal for a numeral "3";

said primary alphanumeric key in said bottom row and said third column capable of generating said numeric signal for a numeral "2";

said primary alphanumeric key in said bottom row and said fourth column capable of generating said numeric signal for a numeral "1"; and said primary alphanumeric key in said bottom row and said first column capable of generating said numeric signal for a numeral "0".

* * * * *